United States Patent
Yamada et al.

(10) Patent No.: US 10,270,310 B2
(45) Date of Patent: Apr. 23, 2019

(54) MOTOR WITH WIRING BOARD FORMED BY CRIMP-CONNECTING WINDING

(71) Applicant: FANUC CORPORATION, Yamanashi (JP)

(72) Inventors: Koutarou Yamada, Yamanashi (JP); Takeshi Tamaki, Yamanashi (JP); Kouji Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 15/483,257

(22) Filed: Apr. 10, 2017

(65) Prior Publication Data
US 2017/0302130 A1  Oct. 19, 2017

(30) Foreign Application Priority Data
Apr. 15, 2016  (JP) .................................. 2016-082099

(51) Int. Cl.
*H02K 5/22* (2006.01)
*H02K 3/28* (2006.01)
*H02K 3/52* (2006.01)

(52) U.S. Cl.
CPC .............. *H02K 5/225* (2013.01); *H02K 3/28* (2013.01); *H02K 3/522* (2013.01); *H02K 2203/03* (2013.01)

(58) Field of Classification Search
CPC ...... H02K 3/28; H02K 5/225; H02K 2203/03; H02K 3/522

(Continued)

(56) References Cited

U.S. PATENT DOCUMENTS

| 2004/0095036 A1* | 5/2004 | Yamamoto ............... H02K 3/28 310/233 |
| 2010/0019592 A1* | 1/2010 | Altindis ................. H02K 3/522 310/71 |

(Continued)

FOREIGN PATENT DOCUMENTS

| CN | 1820401 A | 8/2006 |
| JP | H07-059288 A | 3/1995 |

(Continued)

OTHER PUBLICATIONS

An Office Action mailed by the Japanese Patent Office dated May 22, 2018, which corresponds to Japanese Patent Application No. 2016-082099 and is related to U.S. Appl. No. 15/483,257; with partial English Translation.

(Continued)

*Primary Examiner* — Alex W Mok
(74) *Attorney, Agent, or Firm* — Studebaker & Brackett PC

(57) ABSTRACT

To provide a motor with a wiring board achieving simplification of work and having low probability of contact failure. In a motor with a wiring board provided herein, the wiring board is attached to a stator with multiple wound coils. The wiring board comprises: a circuit board attached to the stator; and multiple crimp terminals arranged on an end face of the circuit board and allowing crimping of ends of the coils. The wiring board (5) is configured in such a manner that the ends extending along the end face of the circuit board are crimped on the crimp terminals, and the crimped ends can be bent to postures along a surface of the circuit board.

4 Claims, 7 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2013/0320788 A1* | 12/2013 | Sakai | ................. H02K 11/0094 |
| | | | 310/71 |
| 2014/0132096 A1 | 5/2014 | Takeda et al. | |
| 2015/0061431 A1* | 3/2015 | Egami | .................... H02K 3/522 |
| | | | 310/71 |

FOREIGN PATENT DOCUMENTS

| | | |
|---|---|---|
| JP | H11-289702 A | 10/1999 |
| JP | 2014-100029 | 5/2014 |
| JP | 2014-155316 A | 8/2014 |
| JP | 2016-036243 A | 3/2016 |

OTHER PUBLICATIONS

Office Action issued by the Chinese Patent Office dated Feb. 2, 2019, which corresponds to Chinese Patent Application No. 201710240097.7 and is related to U.S. Appl. No. 15/483,257; with English language translation.

\* cited by examiner

MOTOR WITH WIRING BOARD FORMED BY CRIMP-CONNECTING WINDING

This application is based on and claims the benefit of priority from Japanese Patent Application No. 2016-082099, filed on 15 Apr. 2016, the content of which is incorporated herein by reference.

BACKGROUND OF THE INVENTION

Field of the Invention

The present invention relates to a motor with a wiring board.

Related Art

According to a technique conventionally known about a motor, a stator-side winding and a circuit board are connected using a wiring board.

For example, patent document 1 discloses a configuration where crimp terminals with power line connecting parts crimp-connect lead wires of multiple split coils in such a manner that the lead wires correspond to a u phase, a v phase, and a w phase of a three-phase AC power supply. Patent document 2 discloses a configuration about wiring of a motor where a stator core is electrically connected to an earth pin by joining a board body including a power line connector integrally provided to the board body and the stator core with a bolt.

Patent Document 1: Japanese Unexamined Patent Application, Publication No. 2014-100029
Patent Document 2: Japanese Unexamined Patent Application, Publication No. H11-289702

SUMMARY OF THE INVENTION

However, connecting the circuit board and an end of the winding pulled out of a stator takes time as this connecting work is done by soldering. Soldering is complicated work and cannot easily be done automatically. Soldering further disadvantageously causes high probability of contact failure. Even with the use of the crimp terminals like in patent document 1, connecting multiple coils to corresponding terminals of the circuit board requires work of connecting each of the crimp terminals under pressure. For this reason, there has been room for improvement in terms of simplification of work and facilitation of automation of the work.

The present invention has been made in view of the aforementioned problem. It is an object of the present invention to provide a motor with a wiring board achieving simplification of work and preventing failure of contact between a coil end and a terminal.

(1) In a motor (a motor 100 or 300 described later, for example) with a wiring board (a wiring board 5 or 205 described later, for example) according to the present invention, the wiring board is attached to a stator (a stator 1 or 201 described later, for example) with multiple wound windings (coils 4 described later, for example). The wiring board comprises: a circuit board (a circuit board 7 or 207 described later, for example) attached to the stator; and multiple crimp terminals (crimp terminals 71 or 271 described later, for example) arranged on an end face of the circuit board and allowing crimping of ends (ends 41 or 241 described later, for example) of the windings.

(2) In the invention described in (1), the wiring board may further comprise a connector (a power line connector 6 described later, for example) electrically connected to the crimp terminals.

(3) In the invention described in (1) or (2), the wiring board may further comprise a wiring settlement member (a wiring settlement member 208 described later, for example) arranged between the stator and the circuit board, the wiring settlement member settling the ends at positions allowing the ends to be crimped on the crimp terminals.

(4) In the invention described in (3), the wiring settlement member may have a recess for housing the circuit board, and the circuit board may be housed in the recess while the ends of the windings are laid across the recess, thereby bending the ends of the windings to positions allowing crimping of the ends and making the ends extend along the end face of the circuit board.

The present invention provides a motor with a wiring board achieving simplification of work and having low probability of contact failure.

DETAILED DESCRIPTION OF THE INVENTION

Figure 1:
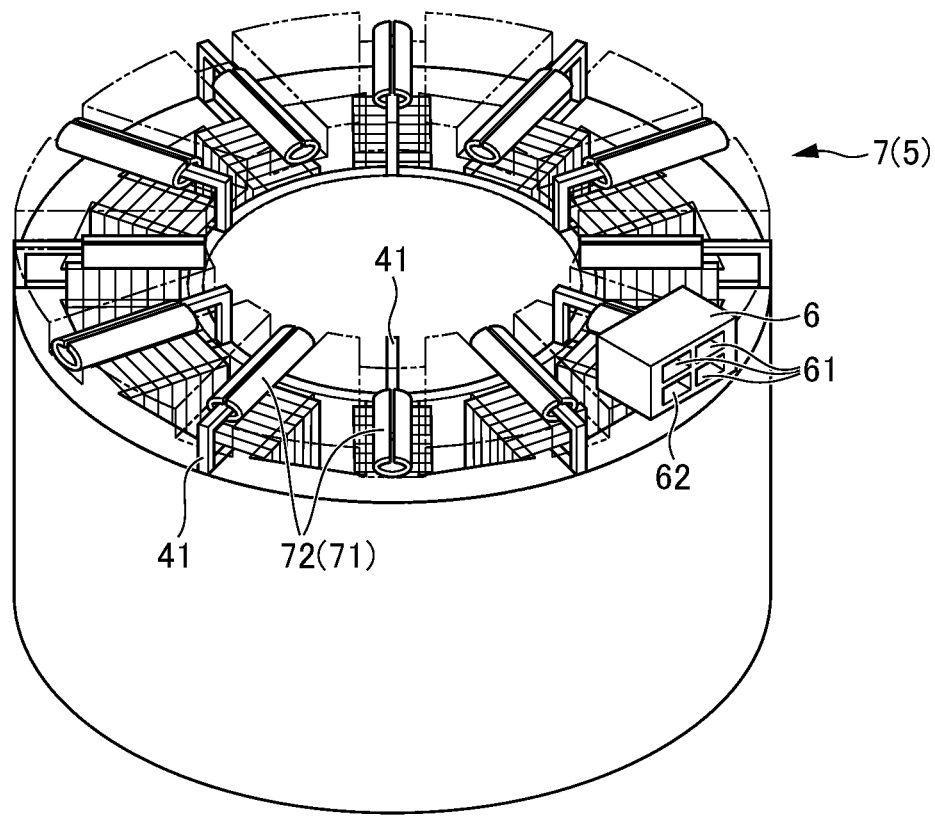
FIG. 1 is a perspective view showing a stator with a wiring board according to an embodiment of the present invention.

An embodiment of the present invention will be described below in detail by referring to the drawings. In the description of a second embodiment and subsequent description, configurations common to those of a first embodiment will be given the same signs or signs having common regularities. Where appropriate, explanation of such configurations will be omitted. In the description given below, a direction in which a wiring board is installed on a stator core will be called a vertical direction.

First Embodiment

Figure 2:
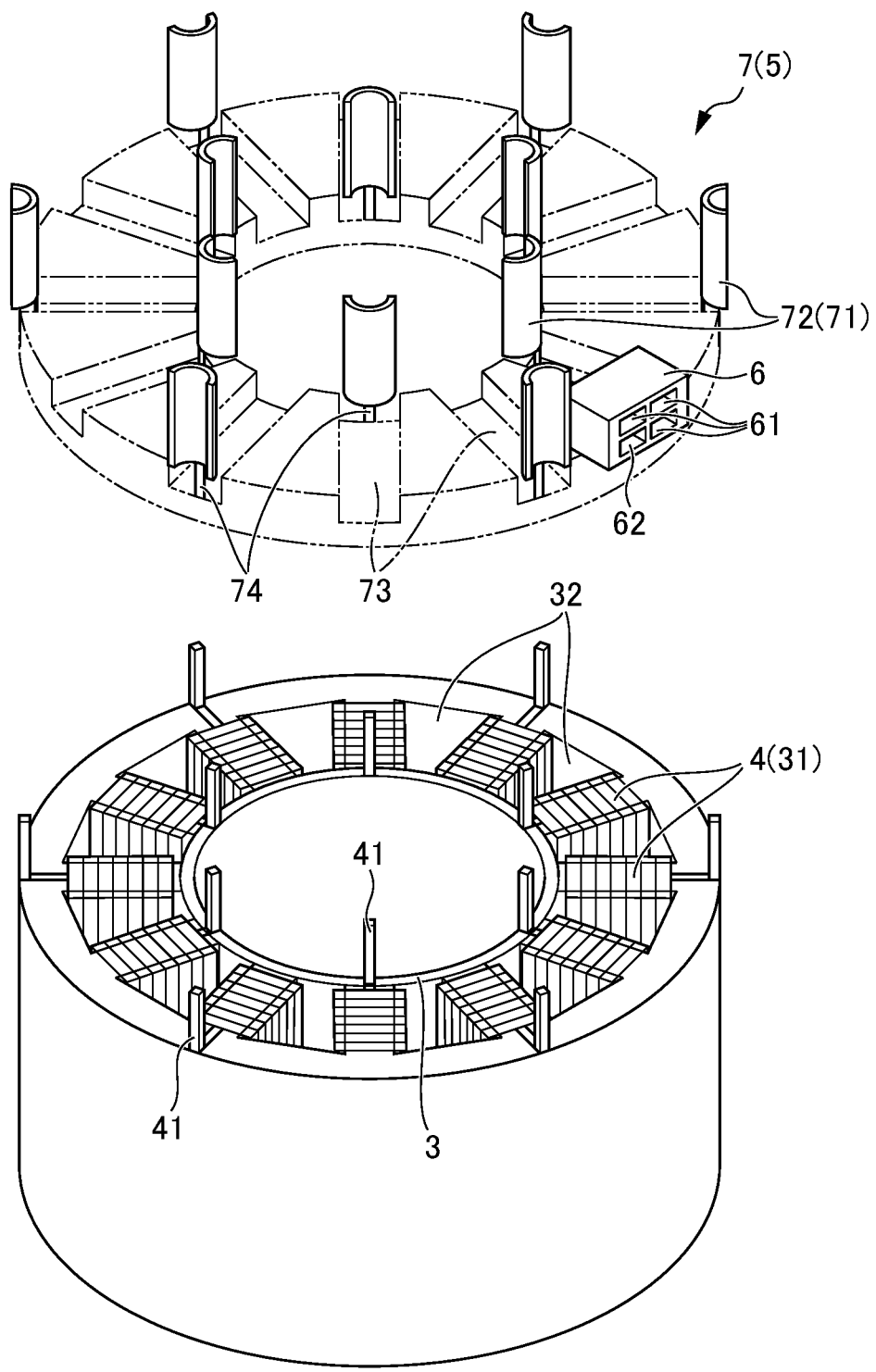
FIG. 2 is an exploded perspective view of the stator according to this embodiment.

FIG. 1 is a perspective view showing a stator 1 with a wiring board 5 according to this embodiment of the present invention. FIG. 2 is an exploded perspective view of the stator 1 according to this embodiment.

The stator 1 shown in FIGS. 1 and 2 is to become a component of a motor 100.

The stator 1 according to this embodiment includes a stator core 3, a coil (winding) 4, a wiring board 5, and a power line connector (connector) 6.

The stator core 3 is formed by laminating multiple steel plates each having a circular hole at the center of the motor 100. The stator core 3 according to this embodiment includes multiple teeth parts 31 provided around the hole and projecting radially outwardly. The multiple teeth parts 31 are spaced uniformly in a peripheral direction. A slot 32 extending continuously in the vertical direction is formed between adjacent ones of the teeth parts 31. A coil 4 is formed at each tooth part 31 of the stator core 3.

A rotor not shown in the drawings is rotatably arranged inside the circular hole of the stator core 3. The wiring board 5 and the power line connector 6 are arranged over the stator core 3. The rotor is rotated by supply of power from the power line connector 6 to the coil 4.

The coil 4 is formed of a conductive wire passed through the slot 32 of the stator core 3 and wound around each tooth part 31 a given number of turns. An end 41 belonging to one side of the coil 4 is arranged to extend upwardly from the stator core 3. An end belonging to an opposite side of the coil 4 (not shown in the drawings) is connected to an end belonging to an opposite side of one of different coils 4 provided below the stator core 3 and spaced at given intervals along the circumference of a circle. In this way, electrical continuity is formed between predetermined ones of multiple coils 4.

The other part of the wound coil 4 except the end 41 is covered with an insulator.

The wiring board 5 is formed into a ring-like shape with a circular through hole formed at the center of the wiring board 5. The wiring board 5 is crimp-connected to each end 41 to supply power to each end 41.

The wiring board 5 according to this embodiment includes a circuit board 7 and a crimp terminal 71 arranged at the circuit board 7. The power line connector 6 is attached to the outer periphery of the circuit board 7 (wiring board 5).

The circuit board 7 is formed into a ring-like shape with a circular through hole formed at the center of the circuit board 7. The circuit board 7 includes crimp terminals 71 of a number corresponding to that of the ends 41. In this embodiment, the crimp terminals 71 are spaced uniformly in a circumferential direction on each of an inner peripheral side and an outer peripheral side of the circuit board 7.

The circuit board 7 has an upper surface provided with grooves 73 extending in a radial pattern and provided at positions corresponding to positions of the crimp terminals 71. The grooves 73 each have a given depth in the vertical direction and are spaced uniformly in the peripheral direction. The groove 73 of the circuit board 7 has a size allowing the end 41 covered by (crimped on) a crimp part 72 and the crimp terminal 71 to be housed together in the groove 73.

In the circuit board 7, the end 41 is housed inside the groove 73 along the upper surface of the circuit board 7. This can prevent contact between the ends 41 and can prevent contact failure caused by the contact between the ends 41. Further, a short between the ends 41 can be prevented in the circuit board 7. This eliminates the need for process of electrically insulating the ends 41, etc., making it possible to reduce the number of works relating to the wiring process. Thus, the wiring process for the circuit board 7 can be simplified.

The crimp terminals 71 are arranged alternately on the inner peripheral side and on the outer peripheral side of the grooves 73 in the peripheral direction. Specifically, the crimp terminal 71 on the inner peripheral side and the crimp terminal 71 on the outer peripheral side are arranged so as not to overlap each other radially. The crimp terminal 71 is arranged to extend upwardly before being used for crimping.

The crimp terminal 71 is configured to crimp the end 41 extending along an end face of the circuit board 7 and to allow the crimped end 41 to be bent to a posture along a surface of the circuit board 7.

The crimp terminal 71 according to this embodiment includes the crimp part 72 to be crimped on the end 41 of the coil 4, and a connecting part 74 connecting the crimp part 72 to the body of the circuit board 7.

The crimp part 72 is formed into a semi-cylindrical shape. The crimp part 72 is crimped on the end 41 so as to cover a side peripheral part of the end 41, thereby connecting the coil 4 and the circuit board 7. The crimp part 72 is crimped while covering the end 41 of the coil 4. This can maintain a favorable connection between the end 41 and the crimp terminal 71 without causing contact failure.

The connecting part 74 is located below the crimp part 72 before being used for crimping. The connecting part 74 is configured in a manner that allows the connecting part 74 to be bent toward a planar part of the circuit board 7. The crimp terminal 71 on the inner peripheral side is bent toward the outer peripheral side to be housed in the groove 73. The crimp terminal 71 on the outer peripheral side is bent toward the inner peripheral side to be housed in the groove 73.

The power line connector (connector) 6 is arranged on the upper surface of the circuit board 7. The power line connector 6 according to this embodiment has an outer side surface with three input parts 61 for connections to power lines and an earth part 62 for a connection to the earth. The power line connector 6 has an inner side surface with a conductive wire 63 that is electrically connected to a corresponding crimp terminal 71. Power lines through which alternating currents are supplied from a three-phase power supply AC unit are connected to corresponding ones of the three input parts 61.

Figure 3:
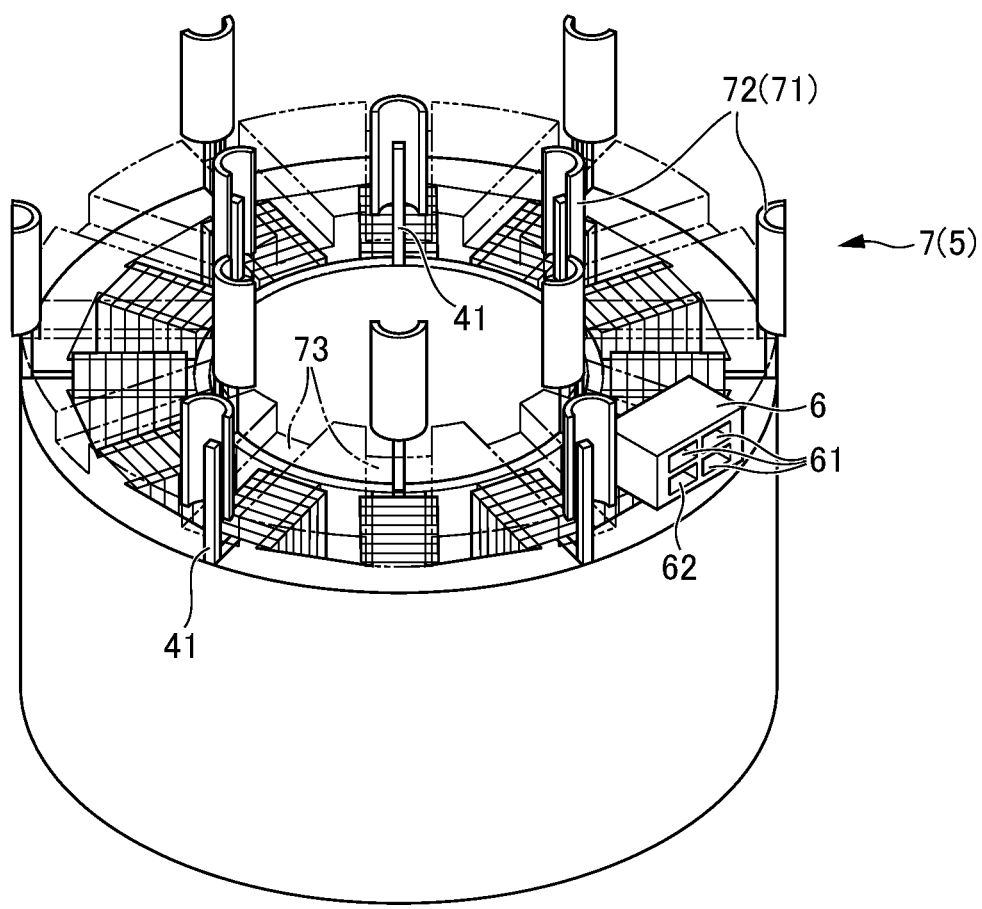
FIG. 3 explains operation of installing the wiring board according to this embodiment.
Figure 4:
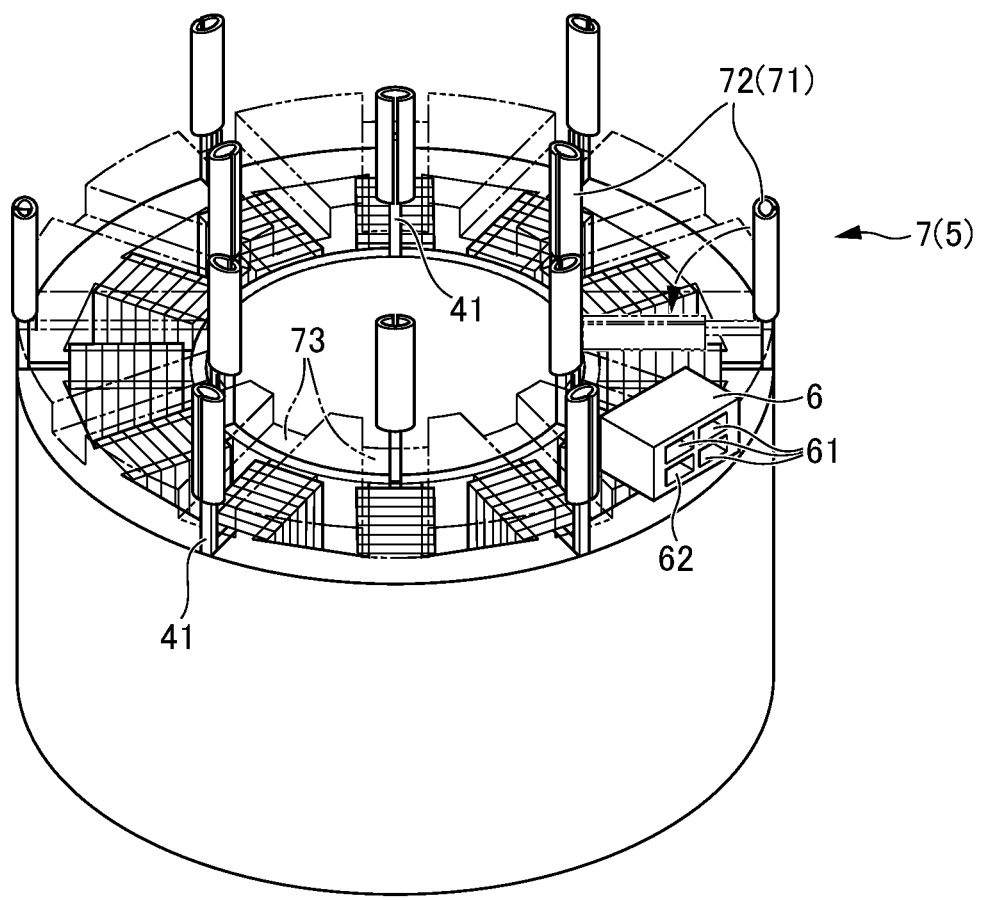
FIG. 4 explains the operation of installing the wiring board according to this embodiment.

The following explains a method of manufacturing the stator 1 having each of the above-described configurations by referring to FIGS. 3 and 4. FIGS. 3 and 4 explain operation of installing the wiring board 5 according to this embodiment.

First, as shown in FIG. 3, the wiring board 5 is installed on the stator core 3 with the wound coil 4 from above so as to form abutting contact between the end 41 and the connecting part 74. By doing so, the end 41 is arranged inside the semi-cylindrical crimp part 72.

Next, as shown in FIG. 4, an opening of the crimp part 72 is closed to cover the side peripheral part of the end 41 with the crimp part 72. By doing so, the crimp part 72 is connected to the end 41 to bring about a condition allowing supply of power through the power line connector 6.

Then, the end 41 on which the crimp terminal 71 is crimped is bent and housed in the groove 73. This brings the wiring board 5 into a condition shown in FIG. 1 where the crimp terminals 71 are crimped on all the ends 41 and the ends 41 are settled in the grooves 73.

Then, the rotor not shown in the drawings is rotatably arranged inside the stator 1 to manufacture the motor 100.

This embodiment achieves the following effects.

(1) In the configuration of the motor 100 with the wiring board 5 according to this embodiment, the wiring board 5 includes the circuit board 7 attached to the stator 1 with the multiple wound coils 4, and the multiple crimp terminals 71 arranged on the end face of the circuit board 7 and allowing crimping of the ends 41 of the coils 4.

Regarding the above-described wiring board 5, the end 41 of each coil 4 is first crimped so as to be covered by the crimp part 72 of the crimp terminal 71 of the circuit board 7, thereby connecting the end 41 to the crimp terminal 71.

Thus, regarding the wiring board 5 according to this embodiment, wiring of the coil 4 is done only by installation of the circuit board 7 on the stator core 3 from above and crimping of the end 41 and the crimp terminal 71 on each other. This eliminates laborious soldering having conventionally been done and forms a reliable connection of the coil 4 to the crimp terminal 71. This achieves simplification of wiring work and shortening of time of the work effectively.

Further, in the configuration according to this embodiment, the end 41 and the crimp terminal 71 are bent together to postures along the surface of the circuit board 7. As a result, the wiring board 5 of the motor 100 provided herein can reduce the probability of contact failure. Further, unlike the conventional configuration, removal of a covering can be omitted, so that the wiring work can be done more preferably.

(2) In the motor 100 with the wiring board 5 described in (1), the wiring board 5 includes the power line connector 6 electrically connected to the crimp terminal 71.

Regarding the motor 100 with the wiring board 5 described in (2), particularly in the wiring board 5 described in (1), the power line connector 6 is connected in advance to the multiple crimp terminals 71. This does not require manual operation for connecting the power line connector 6. Thus, the wiring process is simplified, so that the motor 100 with the wiring board 5 provided herein can be suitable for automation.

Second Embodiment

Figure 5:
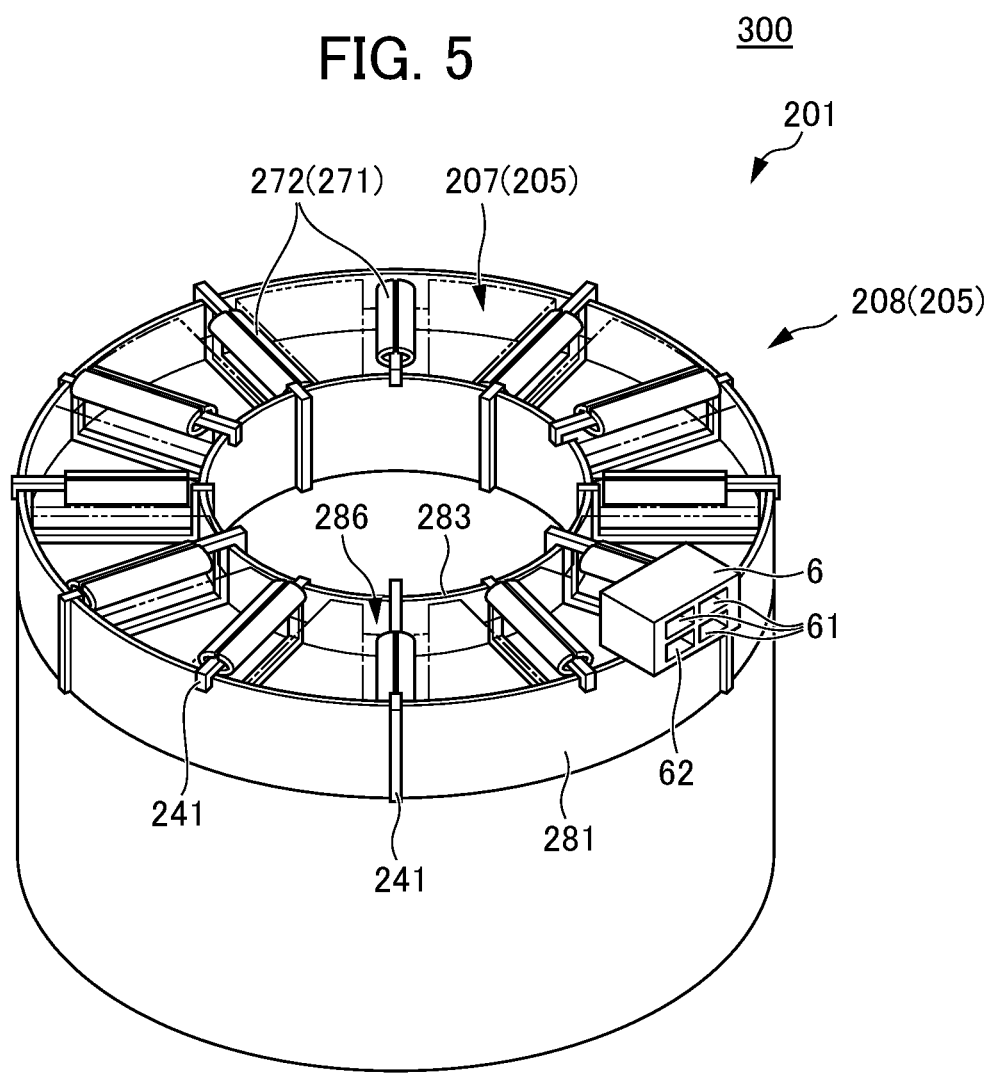
FIG. 5 is a perspective view showing a stator with a wiring board according to a second embodiment.

FIG. 5 is a perspective view showing a stator 201 with a wiring board 205 according to a second embodiment.

As shown in FIG. 5, the wiring board 205 according to the second embodiment differs from the wiring board 5 according to the first embodiment in that the wiring board 205 includes a wiring settlement member 208 formed to surround the outer edge of the circuit board 7 according to the first embodiment. The wiring board 205 will be described in detail below.

The wiring settlement member 208 shown in FIG. 5 is arranged at the top of the stator 201. The wiring settlement member 208 is formed into a ring-like shape with a circular through hole formed at the center of the wiring settlement member 208. The wiring settlement member 208 is formed of an outer peripheral part 281, an inner peripheral part 283, and a bottom part 285 (see FIGS. 6A and 6B). In this way, a recess 286 allowing a circuit board 207 to be housed in the recess 286 is formed inside the wiring settlement member 208.

The outer peripheral part 281 is provided with first cutouts 282 spaced at given intervals. Each of the first cutouts 282 allows a part of an end 241 to be fitted in the first cutout 282. Likewise, the inner peripheral part 283 is provided with second cutouts 284 spaced at given intervals. Each of the second cutouts 284 allows a part of the end 241 to be fitted in the second cutout 284.

Figure 6A:
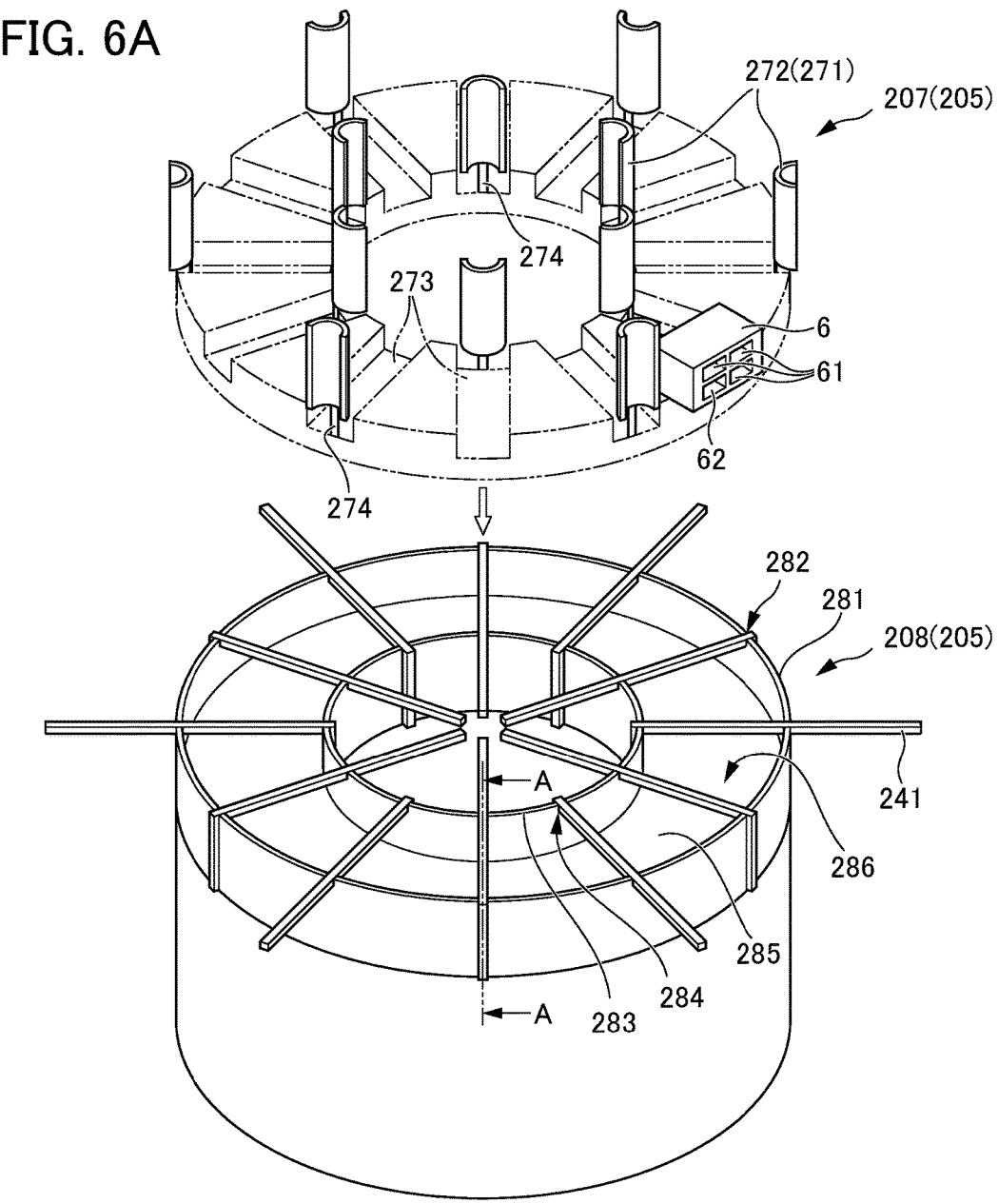
FIG. 6A explains operation of installing the wiring board according to the second embodiment.

The first cutout 282 and the second cutout 284 are arranged on the same straight line so as to make one end 241 extend radially (see FIG. 6A).

The following explains a method of manufacturing the stator 201 having each of the above-described configurations by referring to FIGS. 6A, 6B, 7A, and 7B. FIGS. 6A, 6B, 7A, and 7B explain operation of installing the wiring board 205 according to this embodiment.

Figure 6B:
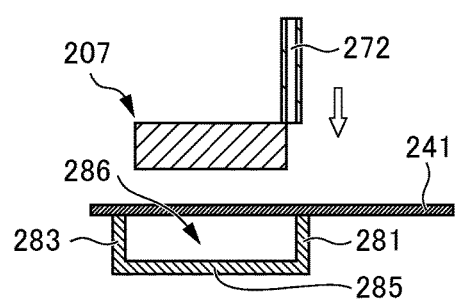
FIG. 6B is a sectional view taken along a line A-A of FIG. 6A.

First, as shown in FIGS. 6A and 6B, the wiring settlement member 208 is arranged on the stator 201 so as to be placed along the stator 201. Next, the end 241 belonging to one side is bent from the first cutout 282 at the outer peripheral part 281 toward the second cutout 284 at the inner peripheral part 283. By doing so, the tip of the end 241 belonging to the one side is arranged radially inwardly.

Likewise, the end 241 belonging to an opposite side is bent from the second cutout 284 at the inner peripheral part 283 toward the first cutout 282 at the outer peripheral part 281. By doing so, the tip of the end 241 belonging to the opposite side is arranged radially outwardly. In this way, the ends 241 are arranged in a radial pattern by the wiring settlement member 208.

Figure 7A:
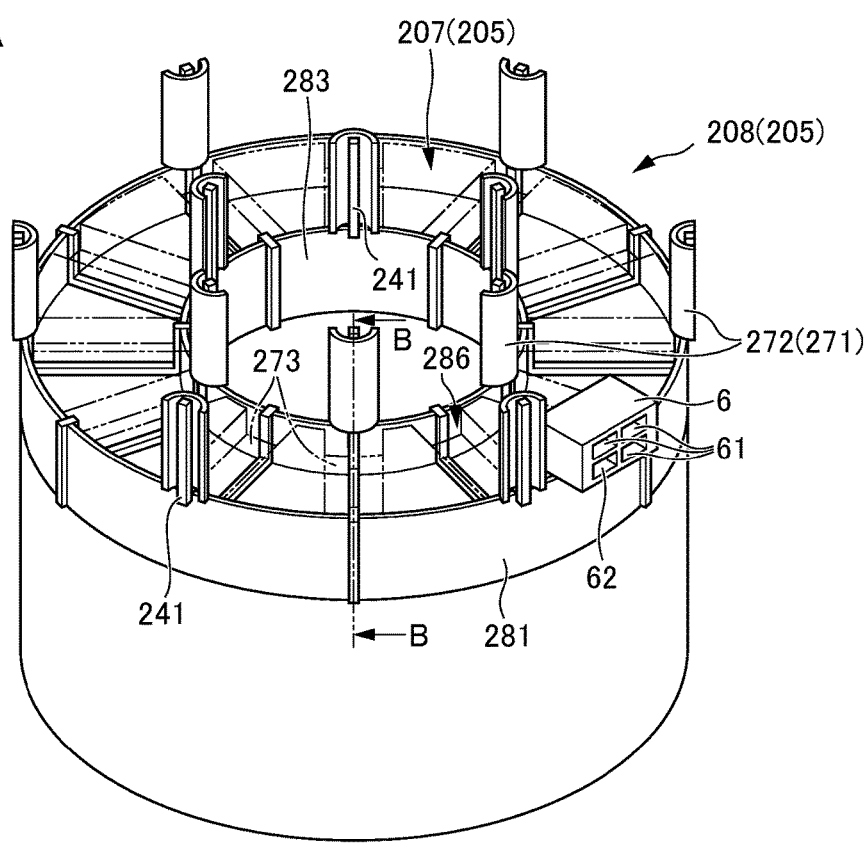
FIG. 7A explains the operation of installing the wiring board according to the second embodiment.
Figure 7B:
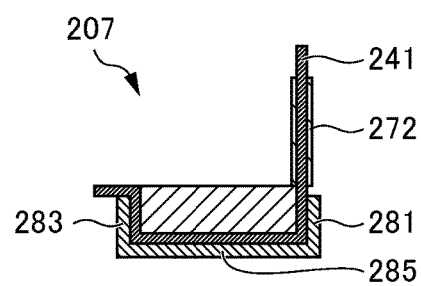
FIG. 7B is a sectional view taken along a line B-B of FIG. 7A.

Next, as shown in FIGS. 7A and 7B, the circuit board 207 is attached to the inside of the wiring settlement member 208 from above. By doing so, the end 241 is bent to extend along the circuit board 207 and the tip of the end 241 is pointed upwardly. As a result, the end 241 is arranged inside a crimp part 272 of a crimp terminal 271.

Then, like in the first embodiment, while the end 241 is crimped inside the crimp part 272 so as to be covered by the crimp part 272, the end 241 is housed in a corresponding groove 273. In this way, the stator 201 shown in FIG. 5 is manufactured.

Then, a rotor not shown in the drawings is arranged inside the stator 201 to manufacture a motor 300.

This embodiment achieves the following effects.

(3) In the motor 300 with the wiring board 205, the wiring board 205 further includes the wiring settlement member 208 arranged between the stator 201 and the circuit board 207. The wiring settlement member 208 settles the end 241 at a position allowing the end 241 to be crimped on the crimp terminal 271.

Regarding the motor 300 with the wiring board 205 described in (3), the wiring settlement member 208 settles the end 241 at a position allowing the end 241 to be crimped on the crimp terminal 271. As a result, the end 241 is reliably crimped on the crimp terminal 271. By achieving crimping more reliably, the motor 300 provided herein includes the wiring board 205 that can reduce the probability of contact failure.

(4) In the motor 300 with the wiring board 205 described in (3), the wiring settlement member 208 has the recess 286 for housing the circuit board 207, and the circuit board 207 is housed in the recess 286 while the end 241 of a coil is laid across the recess 286, thereby bending the end 241 of the coil to a position allowing crimping of the end 241 and making the end 241 extend along the end face of the circuit board 207.

Regarding the motor 300 with the wiring board 205 described in (4), particularly in the wiring board 205 described in (3), the circuit board 207 is housed in the recess 286 while the end 241 of the coil is laid across the recess 286, thereby bending the end 241 of the coil to a position allowing crimping of the end 241 and making the end 241 extend along the end face of the circuit board 207. The effect described in (3) is achieved more specifically.

The present invention is not limited to each embodiment described above but modifications, improvements, etc. can be covered by the present invention as long as such modifications, improvements, etc. are in a range that achieves the purpose of the present invention.

EXPLANATION OF REFERENCE NUMERALS

1, 201 Stator
4 Coil (winding)
41, 241 End 5, 205 Wiring board
71, 271 Crimp terminal
6 Power line connector (connector)
7, 207 Circuit board
208 Wiring settlement member
286 Recess

What is claimed is:

1. A motor with a wiring board attached to a stator with multiple wound windings, the wiring board comprising:
a ring-like circuit board attached to the stator; and
multiple crimp terminals arranged on an end face of the circuit board and allowing crimping of ends of the windings, wherein
the crimp terminals are arranged on each of an inner peripheral side and an outer peripheral side of the circuit board, and
tips of the ends of the windings, on which the crimp terminals are crimped, are arranged radially inward and outward, respectively, of the circuit board.

2. The motor with the wiring board according to claim 1, wherein the wiring board further comprises a connector electrically connected to the crimp terminals.

3. The motor with the wiring board according to claim 1, wherein the wiring board further comprises a wiring settlement member arranged between the stator and the circuit board, the wiring settlement member settling the ends at positions allowing the ends to be crimped on the crimp terminals.

4. The motor with the wiring board according to claim 3, wherein the wiring settlement member has a recess for housing the circuit board, and
the circuit board is housed in the recess while the ends of the windings are laid across the recess, thereby bending the ends of the windings to positions allowing crimping of the ends and making the ends extend along the end face of the circuit board.

* * * * *